United States Patent
Sato et al.

(10) Patent No.: US 7,004,579 B2
(45) Date of Patent: Feb. 28, 2006

(54) INK COMPOSITION CONTAINING A POLYMER COMPLEX, AND AN IMAGE FORMATION METHOD AND EQUIPMENT USING THE INK COMPOSITION

(75) Inventors: Koichi Sato, Kanagawa (JP); Ikuo Nakazawa, Kanagawa (JP); Sakae Suda, Kanagawa (JP); Masayuki Ikegami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 203 days.

(21) Appl. No.: 10/191,597

(22) Filed: Jul. 10, 2002

(65) Prior Publication Data
US 2003/0027894 A1 Feb. 6, 2003

(30) Foreign Application Priority Data
Jul. 10, 2001 (JP) .............................. 2001-209924
Jun. 14, 2002 (JP) .............................. 2002-174350

(51) Int. Cl.
*B41J 2/01* (2006.01)
*C09D 11/10* (2006.01)
*C08L 53/00* (2006.01)
*C08L 29/10* (2006.01)
*C08L 35/08* (2006.01)

(52) U.S. Cl. ............... 347/105; 347/100; 428/32.1; 523/160; 524/505; 524/612

(58) Field of Classification Search ............... 523/160, 523/161; 524/505, 612; 526/332, 333
See application file for complete search history.

(56) References Cited

U.S. PATENT DOCUMENTS

| | | | |
|---|---|---|---|
| 5,085,698 A | | 2/1992 | Ma et al. ....................... 106/20 |
| 5,145,518 A | * | 9/1992 | Winnik et al. ............... 523/161 |
| 5,476,540 A | * | 12/1995 | Shields et al. ............... 524/251 |
| 5,722,322 A | * | 3/1998 | Watanabe ................... 101/129 |
| 5,936,008 A | * | 8/1999 | Jones et al. ................. 523/161 |
| 6,323,257 B1 | * | 11/2001 | Moffatt et al. .............. 523/160 |
| 2001/0018472 A1 | * | 8/2001 | Parazak et al. .............. 523/160 |
| 2002/0032252 A1 | * | 3/2002 | Ishizuka ...................... 523/160 |
| 2003/0081092 A1 | * | 5/2003 | Ishizuka et al. ............. 347/100 |
| 2003/0153649 A1 | * | 8/2003 | Bromberg ................... 523/160 |

FOREIGN PATENT DOCUMENTS

| | | |
|---|---|---|
| EP | 556649 A1 * | 8/1993 |
| JP | 64-63185 | 3/1989 |
| JP | 8-216392 | 8/1996 |
| JP | 11-116877 | 4/1999 |
| JP | 11-236523 | 8/1999 |
| JP | 11-269418 | 10/1999 |
| JP | 2002-069327 | 3/2002 |

OTHER PUBLICATIONS

Journal of the Japan Society of Colour Material, vol. 67(9), pp. 547-554 (1994).
Journal of the Japan Society of Colour Material, vol. 61(12), pp. 692-698 (1988).
"Stimuli-Responsive Block Copolymers with Polyalcohol Segments: Syntheses via Living Cationic Polymerization of Vinyl Ethers with a Silyloxyl Group and Their Thermoreversible Physical Gelation," Aoshima, et al., Journal of Polymer Science, Part A, vol. 39, pp. 746-750, (2001).

* cited by examiner

*Primary Examiner*—Callie Shosho
(74) *Attorney, Agent, or Firm*—Fitzpatrick, Cella, Harper & Scinto

(57) ABSTRACT

The present invention relates to a stimulus responsive composition, which includes a polymer complex that a polymer including repeated units of polyvinyl ether structure is chemically bonded to a functional substance, and a solvent. It is desirable that a solvent is water and that the polymer in the composition contains a polyvinyl ether structure. The present invention also relates to an ink composition including the above composition, an image forming method and image forming device using the above composition, and recording medium contains a stimulating material or composition which stimulates the above composition.

4 Claims, 1 Drawing Sheet

INK COMPOSITION CONTAINING A POLYMER COMPLEX, AND AN IMAGE FORMATION METHOD AND EQUIPMENT USING THE INK COMPOSITION

This application claims the benefit of priority of Japanese Patent Application No. 2001-209924 filed on Jul. 10, 2001 and Japanese Patent Application No. 2002-174350 filed on Jun. 14, 2002, the content of which is incorporated herein by reference.

BACKGROUND OF THE INVENTION

1. Field of the Invention

The present invention relates to the composition containing the polymer, solvent and a functional substance, the composition being useful as various functional materials. In particular, the present invention relates to an image-forming material useful for printers and displays, in which the composition is an aqueous dispersion material, manufacturing method thereof, and image forming method and image forming device therewith.

2. Description of Related Art

The aqueous dispersion materials containing a granular solid have been previously well known as functional materials, for example, agricultural chemicals such as a herbicides and insecticides; medicines such as antitumor substances, antiallergic drugs, and anti-inflammatory agents; coloring materials such as ink and toners. In recent years, as personal computers become less expensive and more sophisticated and as graphical user interface environment are standardized, it becomes more necessary to achieve a recording method with high vividity, high quality, high fastness, high resolution and high speed. In response to the above, the digital printing technique has been improved with extraordinary momentum. Representative examples of the digital printing technique include electrophotography and inkjet technique. The digital printing technique becomes more and more important as an image formation technique in office, home etc. in recent years.

Among the above, the inkjet technique is a direct recording method which has significant features such as compactness and a low power consumption. Moreover, the inkjet technique has rapidly progressed in image quality by the miniaturization of a nozzle etc. An example of an inkjet technique is a method comprising: evaporating and foaming the ink which is supplied from the ink reservoir, by heating with a heater in a nozzle to eject the ink; and forming an image on a recording medium. Another example is the methods of ejecting ink from a nozzle by vibrating a piezo-electric element. Since an aqueous solution of dyes is usually used as the ink for these methods, there are cases where bleeding arises at the time of the superposition of colors, or the phenomenon referred to as "feathering" running in the direction of fiber in the paper may occur at the recorded point of the recording medium. Application of pigment-dispersed ink has been examined in order to improve them (please see, for example, U.S. Pat. No. 5,085,698). However, it is still true that much improvement is desired.

SUMMARY OF THE INVENTION

The present invention provides an ink composition containing a polymer comprising repeated units of polyvinyl ether structure, a solvent and a functional substance, in view of the above points. In particular, the present invention provides a coloring material-dispersed ink composition in which the functional substance is a coloring material such as a pigment or a dye, the ink composition exhibiting high dispersion stability, improvement in bleeding and feathering, and high fixability. The present invention also provides an image forming method and an image forming device using the above coloring material-dispersed ink composition.

The first embodiment of the present invention is an ink composition comprising a polymer complex formed by chemically bonding of a polymer comprising repeated units of polyvinyl ether structure, with a functional substance, and a solvent. A polymer complex, in which a polymerization terminal of the block polymer is chemically bonded to a functional group of the functional substance, may be used preferably. In the present invention, "functional substance" includes substances which exert various functions, and the present specification will demonstrate the case where the functional substance is used as a pigment or a dye. Any of water, aqueous solvents, or organic solvents can be used as the solvent, and preferably water is used. Especially, when water is used as the solvent, a polymer comprising hydrophilic units is preferably used as the polymer comprising repeated units of polyvinyl ether structure, since it enables to achieve good dispersion of the functional substance.

Moreover, if the above ink composition has stimulus responsiveness, better fixability can be imparted to the ink composition by increasing ink viscosity with applying a stimulus during the image forming process. The stimulus may be suitable one for given image forming process, and may be selected from variation in temperature, exposure to electromagnetic radiation, variation in pH, variation in concentration and the like.

The polymer comprising repeated units of polyvinyl ether structure, which is used for the present invention, has no limitation in structure. However, the polymer may be preferably a polymer including polyvinyl ether structure. More specifically, it is preferable that the repeated unit of polyvinyl ether structure has the following formula (1):

$$—(CH_2—CH(OR^1))— \qquad (1)$$

wherein $R^1$ is selected from the group of linear, branched, or cyclic alkyl group having 1–18 carbon atoms; -Ph; -Pyr; -Ph-Ph; -Ph-Pyr; $—(CH(R^2)—CH(R^3)—O)_1—R^4$; and $—(CH_2)_m—(O)_n—R^4$, wherein hydrogen on aromatic ring in $R^1$ may be substituted with linear or branched alkyl group having 1–4 carbon atoms, and carbon in the aromatic ring in $R^1$ may be substituted with nitrogen;

l is selected from an integer of 1 to 18;
m is selected from an integer of 1 to 36;
n is 0 or 1.;
$R^2$ and $R^3$ are independently H or $CH_3$;
$R^4$ is selected from H; linear, branched, or cyclic alkyl group having 1–18 carbon atoms; -Ph; -Pyr; -Ph-Ph, -Ph-Pyr; —CHO; —$CH_2$CHO; —CO—CH=$CH_2$; —CO—C($CH_3$)=$CH_2$; and —$CH_2$COO$R^7$, wherein, when $R^4$ is not hydrogen, hydrogen on carbon atom in $R^4$ may be substituted with linear or branched alkyl group having 1–4 carbon atoms, F, Cl or Br, and carbon in the aromatic ring in $R^4$ may be substituted with nitrogen; and
$R^7$ is H or alkyl group having 1–5 carbon atoms.

The ink composition of the present invention is preferably used as ink for inkjet method.

The second embodiment of the present invention is image forming method in which the above ink composition is used.

For example, the method may involve recording by ejecting ink from an ink ejection port onto a recording medium. Moreover, when using the above stimulus responsive ink composition, the image forming method of the present invention may have stimulating means. For example, the present invention includes a method in which the ink composition is fixed on the recording medium to form an image, by contacting the above stimulus responsive ink composition with a substance or composition which stimulates the ink composition. The stimulating substance or composition may be an ink composition. Alternatively, the stimulating substance or composition may be provided on the recording medium in advance. The image forming method for recording by ejecting the ink from the ink ejection port onto the recording medium may involve application of heat energy to the ink or using a piezoelectric element.

The third embodiment of the present invention is an image forming device which is used for the above image forming method.

The fourth embodiment of the present invention is a recording medium on which a substance or composition for stimulating the stimulus responsive ink composition is provided in advance.

The fifth embodiment of this invention is polymer complex material in which a polymer comprising repeated units of polyvinyl ether structure is chemically bonded with a functional substance. The fifth embodiment may also be a method for making the above polymer complex material comprising the step of reacting the functional substance having a nucleophilic functionality with the polyvinyl ether block polymer in the terminal-activated state which is formed by polymerizing using cation living polymerization. The above polymer complex material may be used as a composition in combination with other materials.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
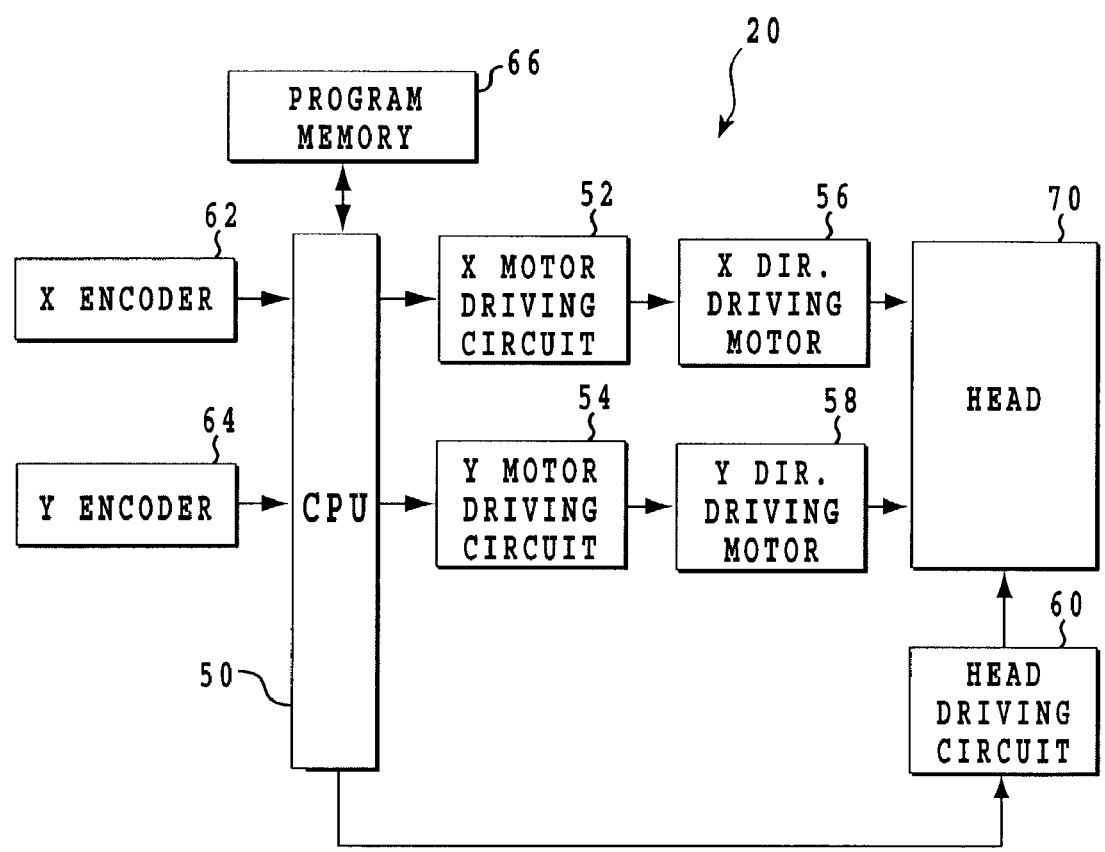
FIG. 1 shows a schematic construction of the image forming device of the present invention.

The composition of the present invention is a functional material, and is an ink composition comprising a polymer complex formed by chemically bonding of a polymer comprising repeated units of polyvinyl ether structure with a functional substance, and a solvent. As used herein, by "chemically bonding" it is meant that a functionality of the functional substance is chemically bonded, preferably covalently bonded to a functionality of the polymer, rather than physical adsorption thereof. It is preferable to use the polymer complex in which the polymerization terminal group of the block polymer is chemically bonded to the functionality of the functional substance. For example, to a solution of the block polymer in the state where its terminal group is activated, which is obtained during synthesis of the block polymer by living polymerization, the functional substance having a functionality reactive with the terminal group can be added to give the polymer complex. If the living polymerization is anionic polymerization, functional substances having an electrophilic functionality can be used, since the polymerizing terminal is an anion. Conversely, in the case of cationic polymerization, functional substances having an nucleophilic functionality can be used, since the polymerizing terminal is an cation.

The polymer having the polyvinyl ether structure contained in the ink composition of the present invention, can be synthesized by the cation living polymerization method. The typical cation living polymerization method is the method of Aoshima et al. (Journal of Polymer Science, PART A, Polymer Chemistry, vol. 39, page 746, 2001). By using this method, it is possible to synthesize the polymer complex of the present invention in which the polymer is chemically bonded to the functional substance. AB block polymers can be synthesized by polymerizing the vinyl ether monomer A along with monitoring the progress of polymerization by the gel permeation chromatography, adding the vinyl ether monomer B at the time of completion of the polymerization of the component A, and continuing polymerization. Finally, the functional substance having a nucleophilic functionality is added into the above reaction mixture, reacting the nucleophilic functionality with the cation on the activated polymerizing terminal to give the polymer complex in which the block polymer is chemically bonded to the functional substance. Exemplary nucleophilic functional group include alcohol, carboxylic acid, amine, sulfonic acid and the like.

The polymer having the polyvinyl ether structure contained in the composition of the present invention is preferably a block polymer. AB block polymers can be synthesized by polymerizing the vinyl ether monomer A along with monitoring the progress of polymerization by the gel permeation chromatography, adding the vinyl ether monomer B at the time of completion of the polymerization of the component A, and continuing polymerization. Finally, the functional substance having a nucleophilic functionality is added into the above reaction mixture, reacting the nucleophilic functionality with the cation on the activated polymerizing terminal to give the polymer complex in which the block polymer is chemically bonded to the functional substance.

The block polymer included in the composition of the present invention substantially retains characteristics of respective blocks or repeated unit structures, so that the characteristics can be exerted concurrently. Particularly, the stimulus responsive block or unit works effectively, and thereby the block polymers can exert their functions more efficiently over the random polymers.

Preferably, the block polymer used in the present invention has two or more kind of different hydrophilic blocks. As used herein, by the term "different " it is meant that the separate blocks have different chemical structure (such as structure of monomer, or branching structure of polymer chains etc.) to each other, and it is not meant that individual repeated units in the polymer chain is different in their chain length. At least one among two or more of the above different hydrophilic blocks respond to stimulus, and thereby the characteristics of the composition changes, for example, from hydrophilic to hydrophobic. On the contrary, there is a case where a block which has exhibited hydrophobicity under a certain conditions responds to stimulus to become hydrophilic block, and thereby the composition is denatured. Preferred example of such stimulus responsive block polymers is a block polymer having plural blocks, two or more blocks among them being hydrophilic blocks, at least one of the hydrophilic blocks is stimulus responsive, and at least one of the other hydrophilic block is always hydrophilic under the overall operating conditions. In such composition, when stimulating the composition in which the stimulus-responsive block is hydrophobic and dispersed as low-viscosity micelle in certain conditions, the stimulus-responsive block becomes hydrophilic, thereby the composition is transformed from low-viscosity dispersed state to high viscous polymer solution state. As described above, the characteristics of the composition of the present invention can change by certain stimulus.

As mentioned above, very preferable stimulus responsiveness can be achieved by using water as the solvent in the case where two or more different hydrophilic block is present in the composition of the present invention. The block configuration of the useful block polymer preferably includes AB, ABA, ABC, ABCD (wherein D is different from A, B and C, and D may be hydrophilic or hydrophobic), and ABCA.

Although the block polymer used for the present invention has no limitation in structure, a repeated unit of a polyvinyl ether structure preferably has the following formula (1):

$$-(CH_2-CH(OR^1))- \quad (1)$$

wherein $R^1$ is selected from the group of linear, branched, or cyclic alkyl group having 1–18 carbon atoms; -Ph; -Pyr; -Ph-Ph; -Ph-Pyr; $-(CH(R^2)-CH(R^3)-O)_l-R^4$; and $-(CH_2)_m-(O)_n-R^4$, wherein hydrogen on aromatic ring in $R^1$ may be substituted with linear or branched alkyl group having 1–4 carbon atoms, and carbon in the aromatic ring in $R^1$ may be substituted with nitrogen.

In the formula (1), l is selected from an integer of 1 to 18; m is selected from an integer of 1 to 36.; and n is 0 or 1. Each of $R^2$ and $R^3$ is independently H or $CH_3$.

$R^4$ is selected from H; linear, branched, or cyclic alkyl group having 1–18 carbon atoms; -Ph; -Pyr; -Ph-Ph; -Ph-Pyr; —CHO; —CH$_2$CHO; —CO—CH=CH$_2$; —CO—C(CH$_3$)=CH$_2$; and —CH$_2$COOR$^7$, wherein, when $R^4$ is not hydrogen, hydrogen on carbon atom in $R^4$ may be substituted with linear or branched alkyl group having 1–4 carbon atoms, F, Cl or Br, and carbon in the aromatic ring in $R^4$ may be substituted with nitrogen. $R^7$ is H or alkyl group having 1–5 carbon atoms.

As used herein, the abbreviations "-Ph", "-Pyr", "-Ph-Ph" and "-Ph-Pyr" denote phenyl group, pyridyl group, biphenyl group and pyridylphenyl group, respectively. As for pyridyl group, biphenyl group and pyridylphenyl group, any of their positional isomers are available.

Vinyl ether monomers which make up the repeated units of the stimulus-responsive and poly vinyl ether structure-containing polymer in the water dispersion, include, but not limited to, the following monomers:

In the above formulae, Me, Et and i-Pr denote methyl, ethyl, and isopropyl group, respectively.

The exemplary structure of polyvinyl ether made from these vinyl ether monomers is shown below, however polymers used for the present invention is not limited to them:

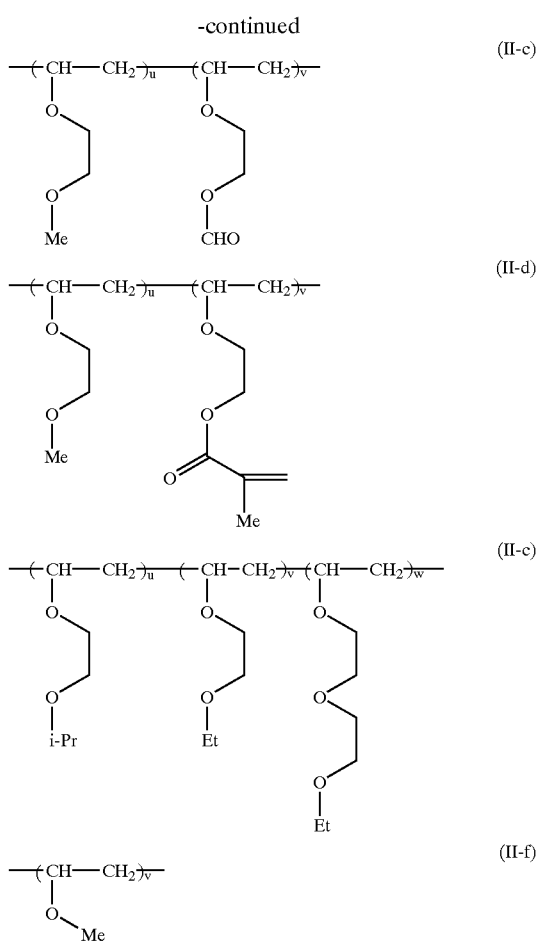

In the above polyvinyl ether, it is desirable that each of the number of repeated units (u, v, and w in (II-a) to (II-f)) ranges independently from 1 to 10,000. More preferably, the total of them (sum of u, v and w in (II-a) to (II-f)) ranges from 10 to 20,000.

The block polymer contained in the ink composition of the present invention is a polymer comprising repeated units of polyvinyl ether structure, and is not limited to a polymer consisting of repeated units of polyvinyl ether structure only. Block polymers made from polyvinyl ether polymer and polymers having other structure, can be also used. Some specific examples of the polymers having other structure may be polymers known in the art including: acrylic polymers; methacrylic polymers; addition-polymerizable polymers such as polystyrene; condensation-polymerizable polymers such as polyethylene terephthalate; polyoxyethylene; polyoxyalkylene and the like.

Alternatively, the block polymer of the present invention may be a graft polymer or graduation polymer including a polyvinyl ether structure.

The content of the block polymer complex in the ink composition of the present invention is desirably 0.1–50% by weight. If the content of a block polymer complex is less than 0.1% by weight, sufficient optical density of the image may not be obtained, and if the content of a block polymer complex exceeds 50% by weight, viscosity may become too large. More preferably, the content is in the range of 0.5% by weight to 30% by weight.

The functional substance useful for the present invention includes coloring materials, metals, and powders of organic materials. The content of the functional substance used for the aqueous dispersion of the present invention is desirably from 0.1 to 50% by weight, based on the weight of the dispersion. Compounds or powder materials compatible with pigments or dyes can be preferably used as the powders of organic materials.

The coloring material used for the present invention has an electrophilic or nucleophilic functionality. When the block polymer are synthesized by cation living polymerization, coloring materials which have nucleophilic functionality are used. Alternatively, when the block polymer are synthesized by anion living polymerization, coloring materials which have electrophilic functionality are used. Such coloring materials are applicable to the method of the present invention, in which activated polymerization terminal is reacted with the functionality of the coloring material, in the solution of block polymers wherein the polymerization terminal is activated when synthesizing the block polymer by living polymerization. Acidic or alkaline coloring materials whose pH value are not neutral often have nucleophilic or electrophilic functionality.

The desirable coloring material of the ink composition of the present invention is a pigment or a dye. The examples of the pigments are shown below.

The pigments may be any of organic pigments and inorganic pigments. A black pigment, and pigments of the three primary colors (cyan, magenta and yellow) are preferably used for the pigments in the ink. Alternatively, pigments having other than the above-described colors, colorless pigments, pale-colored pigments, or metallic luster pigments may be used. Moreover, in the present invention, either of commercially available pigments or pigments which is newly synthesized can be used.

Commercially available pigments of black, cyan, magenta and yellow are listed below.

Black pigments include, but not limited to, Raven® 1060, Raven® 1080, Raven® 1170, Raven® 1200, Raven® 1250, Raven® 1255, Raven® 1500, Raven® 2000, Raven® 3500, Raven® 5250, Raven® 5750, Raven® 7000, Raven® 5000 ULTRA II, and Raven® 1190 ULTRA II (manufactured by Columbian Chemicals Company); Black Pearls® L, MOGUL® L, Regal® 400R, Regal® 660R, Regal® 330R, Monarch® 800, Monarch® 880, Monarch® 900, Monarch® 1000, Monarch® 1300, and Monarch® 1400 (manufactured by Cabot Corporation); Color Black® FW1 Color Black® FW2, Color Black® FW200, Color Black® 18, Color Black® S160, Color Black® 170, Special Black® 4, Special Black® 4A, Special Black® 6, Printex® 35, Printex® U, Printex® 140U, Printex® V, and Printex® 140V (manufactured by Degussa AG); and MITSUBISHI Carbon black #25, #33, #40, #47, #52, #900,#2300, MCF-88, MA600, MA7, MA8, and MA100 (manufactured by Mitsubishi Chemical Corporation).

Cyan pigments include, but not limited to, C. I. Pigment Blue-1, C. I. Pigment Blue-2, C. I. Pigment Blue-3, C. I. Pigment Blue-15, C. I. Pigment Blue-15:2, and C. I. Pigment Blue-15:3, C. I. Pigment Blue-15:4, C. I. Pigment Blue-16, C. I. Pigment Blue-22, and C. I. Pigment Blue-60.

Magenta pigments include, but not limited to, C. I. Pigment Red-5, C. I. Pigment Red-7, C. I. Pigment Red-12, C. I. Pigment Red-48, C. I. Pigment Red-48:1, C. I. Pigment Red-57, C. I. Pigment Red-112, C. I. Pigment Red-122, C. I. Pigment Red-123, C. I. Pigment Red-146, C. I. Pigment Red-168, and C. I. Pigment Red-184, C. I. Pigment Red-202, and C. I. Pigment Red-207.

Yellow pigments include, but not limited to, C. I. Pigment Yellow-12 and C. I. Pigment Yellow-13, C. I. Pigment Yellow-14, C. I. Pigment Yellow-16, C. I. Pigment Yellow-17, C. I. Pigment Yellow-74, and C. I. Pigment Yellow-83 and C. I. Pigment Yellow-93, C. I. Pigment Yellow-95, C. I. Pigment Yellow-97, C. I. Pigment Yellow-98, C. I. Pigment Yellow-114, and C. I. Pigment Yellow-128, C. I. Pigment Yellow-129, C. I. Pigment Yellow-151, and C. I. Pigment Yellow-154.

Alternatively, pigments which are self-dispersible in water can be used in the ink composition of the present invention. The self-dispersible pigments in water are classified into a pigment utilizing steric hindrance effect by adsorbing polymers onto its surface, and a pigment utilizing electrostatic repulsion. Examples of commercially available self-dispersible pigments include CAB-O-JET® 200 and CAB-O-JET® 300(manufactured by Cabot Corporation); and Microjet Black® CW-1 (manufactured by Orient Chemical Industries, Ltd.).

The pigments used for the present invention are pigments which have electrophilic or nucleophilic functionality on their surfaces. When using the block polymers synthesized by cation living polymerization, pigments which have nucleophilic functionality on their surface are used. In other case where the block polymer is synthesized by anion living polymerization, pigments which have electrophilic functionality on their surface are used. Such pigments are applicable to the method of the present invention, in which the activated polymerization terminal is reacted with the functionality of the pigment, in the solution of block polymers in the state that the polymerization terminal is activated when synthesizing the block polymer by living polymerization. Acidic or alkaline pigments whose pH value are not neutral often have nucleophilic or electrophilic functionality. Alternatively, to the ink of the present invention may be added pigments which do not complex with the polymers. The above-described pigments may also be used solely for the present invention.

The content of the pigment in the ink composition of the present invention is desirably 0.1–50% by weight, based on the weight of the ink. If the content of the pigment is 0.1% by weight or more, sufficient optical density of the image can be achieved, and if the content of the pigment is 50% by weight or less, viscosity does not become too large. More preferable range of the content is from 0.5% by weight to 30% by weight.

The dye preferably used in the ink composition of the present invention may be known in the art. Preferably, water-soluble dyes such as direct dyes, acidic dyes, basic dyes, reactive dyes or food dyes; or insoluble dyes such as disperse dyes as shown below, can be used.

For example, the water-soluble dyes useful for the present invention include:

direct dyes such as C. I. Direct Black -17, -19, -22, -32, -38, -51, -62, -71, -108, -146, and -154; C. I. Direct Yellow -12, -24, -26, -44, -86, -87, -98, -100, -130, and -142; C. I. Direct Red -1, -4, -13, -17, -23, -28, -31, -62, -79, -81, -83, -89, -227, -240, -242, and -243; C. I. Direct Blue -6, -22, -25, -71, -78, -86, -90, -106, and -199; C. I. Direct Orange -34, -39, -44, -46, and -60; C. I. Direct Violet -47 and -48; C. I. Direct Blown -109; and C. I. Direct Green-59;

acid dyes such as C. I. Acid Black -2, -7, -24, -26, -31, -52, -63, -112, -118, -168, -172, and -208; C. I. Acid Yellow -11, -17, -23, -25, -29, -42, -49, -61, and -71; C. I. Acid Red -1, -6, -8, -32, -37, -51, -52, -80, -85, -87, -92, -94, -115, -180, -254, -256, -289, -315, and -317; C. I. Acid Blue -9, -22, -40, -59, -93, -102, -104, -113, -117, -120, -167, -229, -234, and -254; C. I. Acid Orange -7 and -19; and C. I. Acid Violet-49;

reactive dyes such as C. I. Reactive Black -1, -5, -8, -13, -14, -23, -31, -34, and -39; C. I. Reactive Yellow -2, -3, -13, -15, -17, -18, -23, -24, -37, -42, -57, -58, -64, -75, -76, -77, -79, -81, -84, -85, -87, -88, -91, -92, -93, -95, -102, -111, -115, -116, -130, -131, -132, -133, -135, -137, -139, -140, -142, -143, -144, -145, -146, -147, -148, -151, -162, and -163; C. I. Reactive Red-3, -13, -16, -21, -22, -23, -24, -29, -31, -33, -35, -45, -49, -55, -63, -85, -106, -109, -111, -112, -113, -114, -118, -126, -128, -130, -131, -141, -151, -170, -171, -174, -176, -177, -183, -184, -186, -187, -188, -190, -193, -194, -195, -196, -200, -201, -202, -204, -206, -218, and -221; C. I. Reactive Blue-2, -3, -5, -8, -10, -13, -14, -15, -18, -19, -21, -25, -27, -28, -38, -39, -40, -41, -49, -52, -63, -71, -72, -74, -75, -77, -78, -79, -89, -100, -101, -104, -105, -119, -122, -147, -158, -160, -162, -166, -169, -170, -171, -172, -173, -174, -176, -179, -184, -190, -191, -194, -195, -198, -204, -211, -216, and -217; C. I. Reactive Orange -5, -7, -11, -12, -13, -15, -16, -35, -45, -46, -56, -62, -70, -72, -74, -82, -84, -87, -91, -92, -93, -95, -97, and -99; C. I. Reactive Violet -1, -4, -5, -6, -22, -24, -33, -36, and -38; C. I. Reactive Green -5, -8, -12, -15, -19, and -23; and C. I. Reactive Blown -2, -7, -8, -9, -11, -16, -17, -18, -21, -24, -26, -31, -32, and -33;

basic dyes such as C. I. Basic Black-2; C. I. Basic Red -1, -2, -9, -12, -13, -14, and -27; C. I. Basic Blue -1, -3, -5, -7, -9, -24, -25, -26, -28, and -29; and C. I. Basic Violet -7, -14, and -27; and food dyes such as C. I. Food Black -1 and -2.

The above examples are particularly preferable coloring materials for the ink composition of the present invention, however, the coloring materials useful for the ink of the present invention are not limited to the above examples.

The content of the dye in the ink composition of the present invention is desirably 0.1–50% by weight, based on the weight of the ink. More preferable range of the content is from 0.5% by weight to 30% by weight.

In the present invention, the pigment can be used in combination with the dye.

The dyes used for the present invention are dyes having nucleophilic functionality when using the block polymers synthesized by cation living polymerization. Such dyes are applicable to the method of the present invention, in which the activated polymerization terminal is reacted with the functionality of the pigment, in the solution of block polymers in the state that the polymerization terminal is activated when synthesizing the block polymer by living polymerization. Acidic or alkaline dyes whose pH value are not neutral often have nucleophilic or electrophilic functionality. Alternatively, to the ink of the present invention may be added dyes which do not complex with the polymers. The above-described dyes may also be used solely for the present invention.

As the solvent of the present invention, water, aqueous solvents, or organic solvents can be used. Preferably, the solvent is water. When water is used as the solvent, polymers comprising hydrophilic units can be preferably used.

Aqueous solvents include, for example, polyhydric alcohols such as ethylene glycol, diethylene glycol, triethylene glycol, polyethylene glycols, propylene glycol, polypropylene glycols and glycerol; ethers of polyhydric alcohols such as ethylene glycol monomethyl ether, ethylene glycol monoethyl ether, ethylene glycol monobutyl ether, diethylene glycol monoethyl ether and a diethylene glycol monobutyl ether; and nitrogen-containing solvents such as N-methyl-2-pyrrolidone, substituted pyrrolidones, and triethanolamine. In the ink application, monohydric alcohols such as methanol, ethanol, and isopropyl alcohol can also be used in order to accelerate drying of the ink on a paper (the recording medium). The ink composition of this invention preferably contains these aqueous solvents in a content of 0.1% by weight to 50% by weight, more preferably 0.5% by weight to 40% by weight. If the content of the aqueous solvent is 0.1% by weight or more, more apparent effect may be exerted. And, if the content is 50% by weight or less, more uniform disperse state can be achieved.

Responsiveness to stimulus can be imparted to the above-describe ink composition. The responsiveness to stimulus can give good fixability to the ink composition, for example, due to thickening of the ink when stimulated during image forming process. The stimulus can be selected from suitable one for image forming, such as variation in temperature, exposure to electromagnetic radiation, variation in pH, variation in concentration and the like.

Especially preferable for the present invention is the ink materials whose characteristics are changed by stimulus. It can be used as a ink material which has improved bleeding and feathering properties on its application onto the recording medium, and excellent fixability. For this reason, the composition of the present invention which is an ink material in which the functional substance is dispersed, can be utilized as image-forming materials exhibiting high image quality, low energy consumption, and a high speed for recording.

The composition of the present invention changes in its state (characteristics) in response to various stimulus. As used herein, the "stimulus" may be variation in temperature; application of electric field; exposure to light (electromagnetic radiation) such as ultraviolet, visible, or infrared light; variation in pH of the composition; addition of chemicals; or variation in concentration of the composition. Suitable stimuli for the present invention are as follows. The first preferred type is variation in temperature, the temperature varying through phase transition temperature of the composition. The second type is exposure to electromagnetic radiation, wavelength of which preferably ranges from 100 nm to 800 nm. The third type is variation in pH of the composition, the range of the variation in pH preferably being within range of pH=3 to pH=12. The fourth type is variation in concentration of the composition. It may be caused by evaporation or absorption of solvents, or by changing the concentration of the polymer dissolved in the composition. The concentration preferably varies through the concentration at which phase transition of the composition occurs. In the present invention, combination of two or more of stimuli can be applied to the composition.

Change in state of the composition of the present invention in response to the applied stimulus may include phase transition from sol state to gel state, phase transition from solution state to solid state, and change in chemical structure. As used herein, by the phrase "stimulus responsiveness", it is meant that change in characteristics of the composition of the present invention is caused by the above-described stimuli. That is, when applying stimulus such as variation in temperature, application of electric field, exposure to electromagnetic radiation, variation in pH, addition of chemicals, or variation in concentration of the composition, morphology and/or properties of the composition change significantly by the above-described stimulus (i.e. environmental change). The properties (state or characteristics) changing in the composition can be variously selected, depending on the use of the composition of the present invention. For example, phase transition (e.g. from sol state to gel state) of the composition is caused by the stimulus to promote the fixability of the composition on the recording medium.

To the ink composition of the present invention can be added optionally various additives and aids. Also, resins having both of hydrophilic and hydrophobic parts or surfactants can be used.

The resins having both of hydrophilic and hydrophobic parts include, for example, copolymers of hydrophilic monomers and hydrophobic monomers. Hydrophilic monomers include acrylic acid, methacrylic acid, maleic acid and monoester thereof, fumaric acid and monoester thereof, vinylsulfonic acid, styrene sulfonic acid, vinyl alcohol, acrylamide, methacryloxyethyl phosphate, and the like. Hydrophobic monomers include styrenic derivative such as styrene or α-methylstyrene, vinylcyclohexane, vinylnaphthalene derivatives, alkyl acrylates, alkyl methacrylates and the like. The copolymer having various structure such as random, block, or graft copolymer can be used. Of course, neither of hydrophilic monomers or hydrophobic monomers is limited as above.

The useful surfactant may be anionic, cationic, amphoteric or nonionic. Anionic surfactants include salts of fatty acids, salts of alkyl sulfate esters, salts of alkylarylsulfonic acids, salts of alkyldiaryletherdisulfonic acids, salts of dialkyl sulfosuccinate esters, salts of alkyl phosphate esters, condensate of naphthalenesulfonic acid and formalin, salts of polyoxyethylenealkyl phosphate esters, salts of glycerol borate fatty acid esters. Nonionic surfactants include polyoxyethylene alkyl ethers, poly(oxyethylene-oxypropylene) block copolymers, fatty acid esters of sorbitan, fatty acid esters of glycerol, fatty acid esters of polyoxyethylenes, polyoxyethylene alkylamines, fluorine-containing surfactants, and silicon-containing surfactants. Cationic surfactants include alkylammonium salts, quaternary ammonium salts, alkylpyridinium salts, and alkylimidazolium salts. Amphoteric surfactants include alkyl betaines, alkylamine oxides, and phosphatidyl choline. In addition, the surfactants are not also limited as above.

Exemplary additives which may be contained in the composition of the present invention, include crosslinking agent, acid generating agents, polymerization initiators and the like, which are activated by application of heat or electromagnetic radiation. Other additives which can be added into the composition of the present invention include pH modifiers for stabilizing of the ink and achieving stabilization of the ink in the tubing of the recording device; penetrants for accelerating permeation of the ink into the recording medium to speed up apparent drying; fungicides for preventing occurrence of molds in the ink; cheleting agents for preventing precipitation of metals in the nozzle part by sequestering metallic ions, and precipitation of insoluble matter in the ink; defoamers for preventing generation of bubbles during circulation, transfer or manufacture of the recording liquids; antioxidants; viscosity modifiers; agents for imparting electrical conductivity; ultraviolet absorbers; and colorants such as water-soluble dye, disperse dyes, solvent dyes, organic pigments or inorganic pigments.

The ink composition of the present invention is preferably used as an inkjet ink.

[Manufacturing Method of the Inkjet Ink]

Exemplary manufacturing method of the inkjet ink of the present invention comprising the steps of: adding a block polymer complex (formed by chemically bonding of the block polymer with the fuctional substance) and dispersion stabilizer into water and water-soluble solvent; removing coarse particle by centrifugation after dispersing with dispersion mixer; adding water or solvent, and additives; stirring; mixing; and filtering.

For example, the dispersion mixer which can be used include ultrasonic homogenizer, laboratory homogenizer, colloid mill, jet mill, and ball mill, which can be used alone or in combination.

In addition, when using self-dispersible pigments as the functional substance, the ink can be prepared similarly by the above-described method.

[Image Forming Method]

The second embodiment of the present invention is the image forming method using the above-mentioned ink composition.

The ink composition of the present invention can be used for various image forming device employed in various printing methods, the inkjet method, xerography and the like, and image forming can be performed using the image forming method with such devices. Especially, the ink composition of the present invention is preferable to use in the inkjet method. The useful inkjet method may be well known methods such as the piezo inkjet method using the piezoelectric element, and the thermal inkjet method in which thermal energy is applied to the ink to form a bubble therein for recording. Moreover, either of continuous type method or on-demand type method can be used. Alternatively, the ink composition of the present invention can be used for the recording system in which after printing image by the ink on intermediate transfer medium, the printed image is transferred to permanent recording medium such as paper.

When using the stimulus responsive ink of the present invention as inkjet ink, it can be used, for example, in the following modes. Ink can be aggregated by stimulus of the following (a) to (d).

(a) When using as ink which responds to stimulus of temperature:

Phase transition of the inkjet ink of the present invention is caused by the stimulus of temperature, and thereby the inkjet ink rapidly thicken or insoluble component is flocculated therefrom. The stimulus of temperature is the difference between the temperature of the ink in an ink reservoir, and the temperature of the ink on the recording medium which adhered by ejection.

(b) When using as ink which responds to stimulus of electromagnetic radiation:

The stimulus of electromagnetic radiation can be provided by exposing ink to visible light when ejected it from ink reservoir which is a darkroom, or by irradiating electromagnetic radiation from electromagnetic radiation source which is provided within the inkjet recording device. Polymerization of polymerizable functionality of the inkjet ink of the present invention is caused by the stimulus of electromagnetic radiation, and thereby the ink thickens or insoluble component is coagulated therefrom.

(c) When using as ink which responds to stimulus by pH variation:

When ink adheres to a recording medium, pH of ink varies in response to the influence of the recording medium. Thereby, phase transition of the inkjet ink of the present invention is caused, and then the inkjet ink rapidly thickens or insoluble component is coagulated therefrom.

(d) When using inkjet ink which responds to stimulus by concentration variation:

Phase transition of the inkjet ink of the present invention is caused by the stimulus of concentration, and thereby the ink rapidly thickens or insoluble component is coagulated therefrom. The stimulus of concentration is the difference between the concentration of the ink in an ink reservoir, and the concentration of the ink on the recording medium after some of water or aqueous solvent in the ejected ink evaporate therefrom or absorbed into the recording medium.

It is possible to improve bleeding and/or feathering, or to achieve excellent fixability, by such change in properties of the ink. In addition, the change in properties of the ink is not limited to thickening or coagulation of insoluble components as described above.

Alternatively, various methods can use for the method of stimulating. One method thereof is mixing or contacting the above-described stimulus responsive ink with a stimulating composition. For example, it is possible to apply the ink-jet method as a method of mixing a composition having suitable pH with the pH-responsive ink of the above (c). It is possible to adhere the stimulating composition on the whole region where images are formed by the inkjet head as disclosed in Japanese Patent Application Laid-open, Sho 64-63185 (1989), or to form more superior images by controlling an adhesion amount of stimulating composition as disclosed in Japanese Patent Application Laid-open, Hei 8-216392 (1996).

Moreover, the stimulating composition can be also used as an ink which contains dyes or pigments. For example, stimulating ink may be used as anyone of cyan-magenta-yellow-black (CMYK) ink used in color inkjet method, and stimulus responsive ink may be used as anyone of the other, thereby it is possible to improve bleeding of colors. There are many various combination for which of CMYK being the stimulus responsive ink and which of them being stimulating ink. In the present invention, all of such combination can be used, and the present inventors do not intend to limit the selection of the combination. Moreover, it is possible to carry out in all the patterns of the stimulus-response as described above, so that types of the stimulating composition and stimulus responsive ink has no particular limitations.

[Image Forming Device]

The third embodiment of the present invention is the image forming device using the above-described ink composition.

The inkjet recording device using the inkjet ink of the present invention includes ink-jet recording devices adapted for a piezo inkjet method wherein piezoelectric elements are used, and a bubbleje™ method which records by applying the heat energy to form a bubble.

FIG. 1 shows the schematic functional diagram of the inkjet recording device. The reference numeral 50 denotes the central processing unit (CPU) of the inkjet recording device. The controlling program for CPU 50 may be placed into program memory 66, or may be memorized by storage means, such as EEPROM (not shown), as so-called firmware. The inkjet recording device receives recording data from record data generating means (not shown) such as computer etc. into the program memory 66. The recording data may be informations of images or characters to be recorded, compressed form of the informations, or encoded information. When using the compressed or encoded informations, information of images or characters can be obtained by having CPU 50 decompress or decode them. X encoder 62 (e.g. relating to X-direction, or main scanning direction) and Y encoder 64 (e.g. relating to Y-direction, or sub scanning direction) can be provided to inform CPU 50 of relative location of the head to the recording medium CPU 50 transmits image recording signals to X motor driving circuit 52, Y motor driving circuit 54, and the head driving circuit 60, based on the informations on the program memory 66 and the informations from the X encoder 62 and the Y encoder 64. The X motor driving circuit 52 and Y motor driving circuit 54 drives the X-direction drive motor 56 and Y-direction drive motor 58, respectively, and thereby a head 70 is relatively moved to the recording medium to a recording position. The head driving circuit 60 transmits ejection signals for various ink compositions (Y, M, C, K) or stimulating compositions to the head 70, at the time that the head arrives the recording position, to perform recording. The head 70 may be designed for ejecting an ink composition of a single color, or for ejecting plurality of ink compositions. The head 70 may also have a function to eject the stimulating composition, simultaneously.

The ink composition of the present invention can be used for not only the device using the direct recording method which directly adheres the ink to the recording medium; but also the indirect recording device which forms useful images by the ink on an intermediate transfer medium bearing latent images, followed by transferring the useful images onto a final recording medium such as a paper. Furthermore, the ink composition of the present invention can be used for the device wherein the intermediate transfer medium is recorded by the direct recording method.

[A Recording Medium]

The fourth embodiment of the present invention is a recording medium which can stimulate the stimulus responsive ink composition of the present invention.

Although the stimulating composition may be mixed or contacted to the stimulus responsive ink, it is also possible to provide the stimulating means to the recording medium in advance. For example, the following methods are usable: recording with acid responsive ink as pH responsive ink onto acidic paper; recording with acid responsive ink as pH responsive ink onto recording media, and the recording media releasing pH modifiers in response to application of heat, electromagnetic radiation or pressure; and recording with stimulus-responsive ink, which contains crosslinkable or polymerizable functionality, on recording media which release crosslinking agents or polymerization initiators in response to application of heat, electromagnetic radiation or pressure. In the present invention, the recording medium may be any of well known form. For example, the recording medium may be an ordinary paper, a thermal paper, or an acidic paper.

When using the direct recording method, the above recording medium are used as a final recording medium. On the other hand, when using the indirect recording method, the above-described recording medium may be used as either of the intermediate transfer medium or the final recording medium.

[Block-polymer Complex]

Furthermore, the fifth embodiment of the present invention is a polymer complex material in which a block polymer having polyvinyl ether structure is chemically bonded to a functional substance. The fifth embodiment of the present invention is also a method for manufacturing the above-described polymer complex material, wherein polyvinyl ether block polymer in terminal-activated state which is polymerized by living polymerization is reacted with the functional substance having nucleophilic functionality. The polymer complex material can also be used as compositions, in combination with other materials. As described above, the polymer complex material is preferably used in the ink composition.

EXAMPLE

The present invention is further explained by the following illustrative examples, although the inventors do not intend that the present invention is limited by the following examples.

Example 1

1) Synthesis of AB di-block polymer made from 2-methoxyethyl vinyl ether (MOVE) and 2-ethoxyethyl vinyl ether (EOVE)

Poly [(2-methoxyethyl vinyl ether)-b-(2-ethoxyethyl vinyl ether)] (as used herein, the symbol "b" denotes that the polymer is a block polymer) was synthesized in accordance with the following procedures. An interior of a glass container equipped with a three-way stopcock was replaced with nitrogen, followed by heating to 250° C. under the nitrogen atmosphere to remove adsorbed water. After the system was cooled to room temperature, 12 mmol of MOVE, 16 mmol of ethyl acetate, 0.1 mmol of 1-isobutoxyethyl acetate and 11 ml of toluene was added and the system was further cooled. When temperature of the system reached 0° C., 0.2 mmol of ethyl aluminum sesquichloride (equimolar mixture of ethyl aluminum dichloride and diethyl aluminum chloride) was added to initiate polymerization, and thereby A component of the AB block polymer was synthesized. Completion of polymerization of the A component was monitored by analyzing molecular weight by using molecular sieving column chromatography (GPC) on the time series. Subsequently, 12 mmol of EOVE was added and the B component was synthesized. Completion of polymerization of the B component was also monitored by GPC. Polymerization reaction was quenched by adding 0.3% by weight of ammonia/methanol solution to the system. The reaction mixture was diluted with dichloromethane, washing three times with 0.6 M hydrochloric acid and then three times with distilled water. The resultant organic phase was concentrated on rotary evaporator to dryness, followed by drying the residue in vacuo to give MOVE-EOVE di-block polymer as the target product. Identification of the product was performed by NMR and GPC, both of them give satisfactory spectra (number average molecular weight:

$M_n=2.5\times10^4$, $M_n/M_w=1.3$, wherein $M_n$ denotes number average molecular weight and $M_w$ denotes weight average molecular weight).

2) Synthesis of polymer complex wherein the di-block polymer of 1) is chemically bonded to a pigment The procedure described in 1) was followed before the step of quenching the polymerization reaction. Powder of 2 mmol of 4,4"-dihydroxyterphenyl which is sufficiently ground in a mortar was dispersed in 3 ml of toluene. The dispersion was added into the reaction system, followed by stirring and leaving it for 1 hour. Thereafter, the temperature of the system was raised to room temperature, and the system was stirred. After leaving the system for another 1 hour, the reaction was worked up to give the product.

Acid content of the above described powder of 4,4"-dihydroxyterphenyl and the polymer complex synthesized in the present example was measured in accordance with the method disclosed in Journal of the Japan Society of Colour Material, vol. 67(9), pages 547–554 (1994) and Journal of the Japan Society of Colour Material, vol. 61(12), pages 692–698 (1988). The measurement showed that the acid content of the latter is 21% of the former. This result shows that hydroxyl group acted as a nucleophile and that 4,4"-dihydroxyterphenyl and poly[MOVE-b-EOVE] was chemically bonded together.

Example 2

The example 1 was repeated except that MITSUBISHI carbon black MA100 (pH=3.5, manufactured by Mitsubishi Chemical Corporation) was used instead of 4,4"-dihydroxyterphenyl, to give readily a complex with the block polymer. Formation of the complex can be confirmed by measurement of acid content by the same method as a Example 1.

Example 3

To 87 parts by weight of ion-exchanged water was added 4 parts by weight of carbon black MOGUL® L(manufactured by Cabot Corporation), 4 parts by weight of the polymer complex obtained in the Example 1, and 5 parts by weight of the diethylene glycol, and the above mixture was dispersed using an ultrasonic homogenizer. Dispersion was processed with the centrifuge (at 20,000 rpm for 20 minutes) to removed coarse particles, to obtain pigment dispersion (ink composition).

The bulk characteristics of the above-mentioned ink are demonstrated below.

When pH 2 aqueous solution containing 5% by weight of polyacrylic acid was added to this ink to adjust pH of the solution to 3, black precipitate was formed also in this case and the gel was also formed partially. This result is due to complexation of the carboxylic acid of the polyacrylic acid and the block polymer.

At room temperature, this ink was low viscous black ink wherein carbon black was well dispersed. When cooled it to 10° C., it transformed into viscous solution. This result is due to dissolution of all of the micelles into molecular state, caused by change of the EOVE block to hydrophilic.

Example 4

Fixability was evaluated using the inkjet ink prepared in the previous Example 1. The inkjet ink of the above Example 1 was charged into the print head of inkjet printer BJF800 (manufactured by Canon Inc.), and recording on an ordinary paper was carried out using the above-described inkjet printer.

(a) Evaluation of the inkjet ink which responds to stimulus of change in pH

When recording with the present inkjet ink, first, pH=2 aqueous solution of 5% by weight of polyacrylic acid was sprayed onto an ordinary paper, to prepare a stimulating recording medium. To this stimulating recording medium, recording was carried out in the same manner as described above.

After one minute of recording, the recorded medium was pressed against another white ordinary paper with a pressure of $4.9 \times 10^4$ $N/m^2$, and the fixability was evaluated by whether the ink was transferred onto the white ordinary paper or not. Transfer of the ink to the white ordinary paper was not observed. This result was caused by complexation of poly [MOVE-b-EOVE] with the polyacrylic acid.

(b) Evaluation of the inkjet ink which responds stimulus of temperature

Recording with the present inkjet ink was carried out with cooling the landing area of ejected ink in the above inkjet printer to 10° C. Fixability was evaluated in the same manner as the above (a), and transfer of the ink to the white ordinary paper was not also observed.

Example 5

The polymer complex obtained by Example 2 was evaluated by the same manner as described in Example 4. All evaluation was good.

Comparative Example 1

The ink composition was prepared by mixing 15% by weight of self-dispersible pigment (CAB-O-JET® 300 manufactured by Cabot Corporation), 0.5% by weight of surfactant (nonion E-230 manufactured by NOF Corporation) and 10% by weight of ethylene glycol and 74.5% by weight of water. Recording and evaluation of fixability for the above ink composition were carried out in the same manner as described Example 4. Transfer of the ink to the white ordinary paper was observed.

Example 6

The procedure described in 1) of Example 1 was followed before the step of quenching the polymerization reaction. Into the reaction system, 2 mmol of C. I. Acid Blue-9 was added into the reaction system, followed by stirring and leaving it for 1 hour. Thereafter, the temperature of the system was raised to room temperature, and the system was stirred. After leaving the system for another 1 hour, the reaction was worked up to give the product.

Analysis of the product by the diffusion-ordered 2D NMR (DOSY) spectroscopy showed that the diffusion coefficient of C. I. acid blue-9 has the same phase as that of poly [MOVE-b-EOVE], and thereby C. I. Acid Blue-9 bonds to poly[MOVE-b-EOVE].

Example 7

A complex of the block polymer and C. I. Acid Orange-52 was easily obtained by following the operation of Example 6 except that C. I. Acid Orange-52 was used as the dye.

The formation of the complex was also confirmed by the similar method to Example 6.

Example 8

To 67 parts by weight of ion-exchanged water was added 5 parts by weight of the polymer complex obtained in the Example 7, 10 parts by weight of the diethylene glycol, 10 parts by weight of the ethanol, and 8 parts by weight of the 2-pyrrolidone, and the above mixture was dispersed using an ultrasonic homogenizer. The dispersion was filtrated with membrane filter under pressure to obtain ink composition.

The bulk characteristics of the above-mentioned ink are demonstrated below.

When pH 2 aqueous solution containing 5% by weight of polyacrylic acid was added to this ink to adjust pH of the solution to 3, blue precipitate was formed in this case and the gel was also formed partially. This result is due to complexation of the carboxylic acid of the polyacrylic acid and the block polymer.

Example 9

Fixability was evaluated using the inkjet ink prepared in the previous Example 8. The inkjet ink of the above Example 8 was charged into the print head of inkjet printer BJF800 (manufactured by Canon Inc.), and recording on an ordinary paper was carried out using the above-described inkjet printer.

Feathering was observed with a magnifier and classified into five grade for printed sample on which dots was recorded with 5 mm spacing, and which was left for 30 minutes or more after printing:

5: dot is a perfect circle;
4: bleeding occurs on a quarter length of the circumference in total;
3: bleeding occurs on a total of a half length of the circumference in total;
2: bleeding occurs on a total of three quarter length of the circumference in total; and
1: dot is out of round at all.

(a) Evaluation of the inkjet ink which responds to stimulus of change in pH

When recording with the present inkjet ink, first, pH=2 aqueous solution of 5% by weight of polyacrylic acid was sprayed onto an ordinary paper, to prepare a stimulating recording medium. To this stimulating recording medium, recording was carried out in the same manner as described above.

Feathering was evaluated to 4–5. This result was caused by complexation of poly [MOVE-b-EOVE] with the polyacrylic acid.

(b) Evaluation of the inkjet ink which responds stimulus of temperature

Recording with the present inkjet ink was carried out with cooling the landing area of ejected ink in the above inkjet printer to 10° C. Feathering was evaluated to 4–5.

Example 10

The polymer complex obtained by Example 7 was evaluated by the same manner as described in Example 9. Feathering was evaluated to 4–5, in either case where stimulus is change in pH or change in temperature.

As demonstrated above, according to the present invention, a good ink composition can be achieved. Moreover, images having excellent fixability can be provided, by using the functional ink, the image forming method and device therewith.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An image forming method comprising a step of forming an image on a recording medium with an ink composition, wherein said ink composition comprises a polymer complex formed by chemically bonding a polymer comprising repeating units of polyvinyl ether structure with a functional substance, and a solvent, and wherein said ink composition is fixed on the recording medium by contacting a material stimulating said ink composition on the recording medium.

2. An image forming method as claimed in claim 1, wherein the stimulating material is a different ink composition from said ink composition.

3. An image forming method as claimed in claim 1, wherein the stimulating material is previously provided on said recording medium.

4. A recording medium for image forming by ejecting an ink composition, wherein said ink composition is a stimulus-responsive ink composition and comprises a polymer complex formed by chemically bonding a block polymer comprising repeating units of polyvinyl ether structure with a pigment, and wherein a material for stimulating the ink composition is provided on said recording medium.

* * * * *

UNITED STATES PATENT AND TRADEMARK OFFICE
CERTIFICATE OF CORRECTION

PATENT NO. : 7,004,579 B2
APPLICATION NO. : 10/191597
DATED : February 28, 2006
INVENTOR(S) : Koichi Sato et al.

It is certified that error appears in the above-identified patent and that said Letters Patent is hereby corrected as shown below:

On the title page, at (57) Abstract:

Line 10, "recording medium" should read --a recording medium that--.

Column 1:

Line 31, "environment" should read --environments--.

Column 2:

Line 30, "suitable" should read --a suitable--, and "given" should read --a given--.
Line 55, "-Ph-Ph," should read -- -Ph-Ph;--.
Line 66, "image" should read --an image--.

Column 4:

Line 3, "an cation." should read --a cation.--.
Line 15, "the gel" should read --gel--.
Line 24, "group" should read --groups--.
Line 30, "the gel" should read --gel--.
Line 48, "kind" should read --kinds--.
Line 53, "is different" should read --are different--.
Line 61, "Preferred" should read --A preferred--.

Column 5:

Line 49, "but not" should read --but are not--.

Column 6:

Line 44, "is not" should read --are not--.

Column 8:

Line 35, "which is" should read --which are--.
Line 38, "not" should read --are not--.
Line 47, "FW1" should read --FW1,--.
Line 53, "#900,#2300," should read --#900, #2300,--.
Line 56, "not" should read --are not--.
Line 61, "not" should read --are not--.

UNITED STATES PATENT AND TRADEMARK OFFICE
CERTIFICATE OF CORRECTION

PATENT NO. : 7,004,579 B2  
APPLICATION NO. : 10/191597  
DATED : February 28, 2006  
INVENTOR(S) : Koichi Sato et al.

It is certified that error appears in the above-identified patent and that said Letters Patent is hereby corrected as shown below:

Column 9:

Line 1, "not" should read --are not--.
Line 61, "Blown" should read --Brown--.

Column 10:

Line 24, "Blown" should read --Brown--.

Column 11:

Line 12, "describe" should read --described--.
Line 21, "a ink" should read --an ink--.

Column 12:

Line 50, "cheleting" should read --chelating--.

Column 13:

Line 16, "device" should read --devices--.
Line 48, "ejected" should read --ejecting--.

Column 14:

Line 12, "can use" should read --can be used--.
Line 31, "combination" should read --combinations--.
Line 33, "combination" should read --combinations--.
Line 48, "bubbleje™" should read --bubblejet™--.
Line 67, "medium" should read --medium.--.

Column 16:

Line 64, "above described" should read --above-described--.

Column 18:

Line 1, "responds" should read --responds to--.
Line 23, "described" should read --described in--.

UNITED STATES PATENT AND TRADEMARK OFFICE
CERTIFICATE OF CORRECTION

PATENT NO. : 7,004,579 B2
APPLICATION NO. : 10/191597
DATED : February 28, 2006
INVENTOR(S) : Koichi Sato et al.

It is certified that error appears in the above-identified patent and that said Letters Patent is hereby corrected as shown below:

COLUMN 19:

Line 10, "grade" should read --grades--.
Line 32, "responds" should read --responds to--.

Column 20:

Line 13, "apparent" should read --appended--.

Signed and Sealed this

Twentieth Day of March, 2007

JON W. DUDAS
*Director of the United States Patent and Trademark Office*